United States Patent
Balasubramanian et al.

(10) Patent No.: US 11,818,757 B2
(45) Date of Patent: Nov. 14, 2023

(54) PROTOCOLS FOR SIDELINK ASSISTED DOWNLINK BROADCAST

(71) Applicant: INTERDIGITAL PATENT HOLDINGS, INC., Wilmington, DE (US)

(72) Inventors: Anantharaman Balasubramanian, San Diego, CA (US); Ravikumar Pragada, Warrington, PA (US); Nagi Mahalingam, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 685 days.

(21) Appl. No.: 16/977,708

(22) PCT Filed: Mar. 1, 2019

(86) PCT No.: PCT/US2019/020279
§ 371 (c)(1),
(2) Date: Sep. 2, 2020

(87) PCT Pub. No.: WO2019/169260
PCT Pub. Date: Sep. 6, 2019

(65) Prior Publication Data
US 2020/0413442 A1 Dec. 31, 2020

Related U.S. Application Data

(60) Provisional application No. 62/637,715, filed on Mar. 2, 2018.

(51) Int. Cl.
*H04W 4/00* (2018.01)
*H04W 74/08* (2009.01)
(Continued)

(52) U.S. Cl.
CPC ....... *H04W 74/0808* (2013.01); *B64C 39/024* (2013.01); *H04L 1/1621* (2013.01);
(Continued)

(58) Field of Classification Search
CPC ... H04W 74/0808; H04W 4/08; H04W 72/04; H04W 72/042; H04L 5/00; H04L 5/0055; H04L 1/16; H04L 1/1621
(Continued)

(56) References Cited

U.S. PATENT DOCUMENTS 8,477,666 B2 * 7/2013 Astely ................. H04L 1/1621
370/252
8,493,902 B2 7/2013 Suri et al.
(Continued)

FOREIGN PATENT DOCUMENTS

| WO | 2012/052911 | 4/2012 |
| WO | 2016/123045 | 8/2016 |
| WO | 2018/137129 | 8/2018 |

OTHER PUBLICATIONS

Dahlman et al., *4G: LTE/LTE-Advanced for Mobile Broadband*, 2nd edition, Academic Press (Dec. 20, 2013).
(Continued)

*Primary Examiner* — Marceau Milord
(74) *Attorney, Agent, or Firm* — VOLPE KOENIG

(57) ABSTRACT

A wireless transmit/receive unit (WTRU) may receive a downlink communication from a network over a first interface transmitted to one or more WTRUs in a group of WTRUs. The WTRU may determine an access class of the WTRU based on a packet loss percentage of the downlink communication. The access class may be associated with a contention window for accessing a second interface. The WTRU may transmit packet loss information to the one or more WTRUs over the second interface in the contention
(Continued)

window. The WTRU may receive packet loss feedback from the one or more WTRUs over the second interface. The WTRU may determine that the access class of the WTRU is a highest class of the one or more WTRUs. The WTRU may transmit a single groupcast negative acknowledgement (gNACK) to the network on behalf of the one or more WTRUs over the first interface.

20 Claims, 11 Drawing Sheets

(51) Int. Cl.
 B64C 39/02 (2023.01)
 H04L 1/1607 (2023.01)
 H04L 5/00 (2006.01)
 H04W 4/08 (2009.01)
 H04W 72/23 (2023.01)
 H04W 92/18 (2009.01)

(52) U.S. Cl.
 CPC ............ *H04L 5/0055* (2013.01); *H04W 4/08* (2013.01); *H04W 72/23* (2023.01); *H04W 92/18* (2013.01)

(58) Field of Classification Search
 USPC ......................................................... 370/329
 See application file for complete search history.

(56) References Cited

U.S. PATENT DOCUMENTS

| | | | |
|---|---|---|---|
| 8,891,421 B2 | 11/2014 | Gaur | |
| 9,059,848 B2 | 6/2015 | Larmo et al. | |
| 10,111,190 B2 | 10/2018 | Pelletier et al. | |
| 11,088,788 B2 | 8/2021 | Liu et al. | |
| 11,533,131 B2* | 12/2022 | Choi | H04W 72/23 |
| 11,546,092 B2* | 1/2023 | Lei | H04L 1/1825 |
| 2012/0327760 A1 | 12/2012 | Du et al. | |
| 2013/0225184 A1 | 8/2013 | Liu et al. | |
| 2015/0124601 A1 | 5/2015 | Li et al. | |
| 2016/0227463 A1 | 8/2016 | Baligh et al. | |
| 2018/0146418 A1* | 5/2018 | Sharma | H04W 48/16 |
| 2018/0198465 A1 | 7/2018 | Ericson et al. | |
| 2018/0287750 A1 | 10/2018 | Abdoli et al. | |
| 2018/0359656 A1* | 12/2018 | Liu | H04W 48/12 |
| 2019/0045427 A1* | 2/2019 | Logan | H04L 25/0202 |
| 2020/0059327 A1* | 2/2020 | Kini | H04L 1/1812 |
| 2020/0389264 A1* | 12/2020 | Hedayat | H04L 1/1887 |
| 2021/0184801 A1* | 6/2021 | El Hamss | H04L 1/1896 |

OTHER PUBLICATIONS

Huawei et al., "On transmit power and power ramping for PRACH in coverage enhancement," 3GPP TSG RAN WG1 Meeting #81, R1-152456, Fukuoka, Japan (May 25-29, 2015).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Kim et al., "Group Communications Over LTE: A Radio Access Perspective", IEEE Communications Magazine (Apr. 2016).
Lecompte et al., "Evolved Multimedia Broadcast/Multicast Service (eMBMS) in LTE-Advanced: Overview and Rel-11 Enhancements," IEEE Communication Magazine, pp. 68-74 (Nov. 2012).
Liu et al., "On the Capacity for Distributed Index Coding," Proceedings on IEEE International Symposium on Information Theory, pp. 3055-3059 (Jun. 2017).
NTT DOCOMO Inc. et al., "New SID on Enhanced LTE Support for Aerial Vehicles," 3GPP TSG RAN Meeting #75, Draft RP-170156 Dubrovnik, Croatia (Mar. 6-9, 2017).
NTT DOCOMO Inc., "Potential challenges on emerging drone services," 3GPP TSG-RAN WG2 #97, R2-1701077, Athens, Greece (Feb. 13-17, 2017).
NTT DOCOMO Inc., "Summary of email discussion [99#37][LTE/UAV] DL and UL Interference detection," 3GPP TSG-RAN WG2 #99bis, R2-1711738, Prague, Czech Republic (Oct. 9-13, 2017).
Qualcomm, "Leading the world to 5G: Evolving cellular technologies for safer drone operation," pp. 1-31 (Sep. 2016).
Sadeghi et al., "Distributed Index Coding," Proceedings on Information Theory Workshop (ITW), pp. 330-334 (Sep. 2016).
Third Generation Partnership Project, "Technical Specification Group Services and System Aspects; Feasibility Study on New Services and Markets Technology Enablers; Stage 1 (Release 14)," 3GPP TR 22.891 V14.2.0 (Sep. 2016).
Third Generation Partnership Project, "Technical Specification Group Radio Access Network; Evolved Universal Terrestrial Radio Access (E-UTRA); Physical channels and modulation (Release 14)," 3GPP TS 36.211 V14.1.0 (Dec. 2016).
Third Generation Partnership Project, "Technical Specification Group Radio Access Network; Evolved Universal Terrestrial Radio Access (E-UTRA); Physical channels and modulation (Release 15)," 3GPP TS 36.211 V15.0.0 (Dec. 2017).
Third Generation Partnership Project, "Technical Specification Group Radio Access Network; Evolved Universal Terrestrial Radio Access (E-UTRA); Physical channels and modulation (Release 15)," 3GPP TS 36.211 V15.4.0 (Dec. 2018).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.4.0 (Sep. 2017).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.0.0 (Dec. 2017).
Third Generation Partnership Project, "Technical Specification Group Services and System Aspects; Feasibility Study on New Services and Markets Technology Enablers; Stage 1 (Release 14)," 3GPP TR 22.891 V1.3.2 (Feb. 2016).
Third Generation Partnership Project, "Technical Specification Group Radio Access Network; Study on channel model for frequency spectrum above 6 GHz (Release 14)," 3GPP TR 38.900 V14.2.0 (Dec. 2016).
Third Generation Partnership Project, "Technical Specification Group Radio Access Network; Evolved Universal Terrestrial Radio Access (E-UTRA); Study on single-cell point-to-multipoint transmission for E-UTRA (Release 13)," 3GPP TR 36.890 V13.0.0 (Jun. 2015).

(56) References Cited

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.4.0 (Dec. 2018).

Third Generation Partnership Project, "Technical Specification Group Radio Access Network; Study on channel model for frequency spectrum above 6 GHz (Release 15)," 3GPP TR 38.900 V15.0.0 (Jun. 2018).

Third Generation Partnership Project, "Technical Specification Group Radio Access Network; Study on channel model for frequency spectrum above 6 GHz (Release 14)," 3GPP TR 38.900 V14.3.1 (Jul. 2017).

Third Generation Partnership Project, "Technical Specification Group Services and System Aspects; Multimedia Broadcast/Multicast Service (MBMS); Protocols and codecs (Release 9)," 3GPP TS 26.346 V9.4.0 (Sep. 2010).

Third Generation Partnership Project, "Technical Specification Group Services and System Aspects; Multimedia Broadcast/Multicast Service (MBMS); Protocols and codecs (Release 15)," 3GPP TS 26.346 V15.0.0 (Dec. 2017).

Third Generation Partnership Project, "Technical Specification Group Services and System Aspects; Multimedia Broadcast/Multicast Service (MBMS); Protocols and codecs (Release 15)," 3GPP TS 26.346 V15.3.0 (Dec. 2018).

Third Generation Partnership Project, "Technical Specification Group Services and System Aspects; Multimedia Broadcast/Multicast Service (MBMS); Protocols and codecs (Release 16)," 3GPP TS 26.346 V16.0.0 (Dec. 2018).

* cited by examiner

PROTOCOLS FOR SIDELINK ASSISTED DOWNLINK BROADCAST

CROSS-REFERENCE TO RELATED APPLICATIONS

This application is the U.S. National Stage, under 35 U.S.C. § 371, of International Application No. PCT/US2019/020279 filed Mar. 1, 2019, which claims the benefit of U.S. Provisional Application No. 62/637,715 filed Mar. 2, 2018, the contents of which are incorporated herein by reference.

BACKGROUND

In Third Generation Partnership Project (3GPP) standards for wireless communication, every individual member of a group may need to give a report of every packet that is sent whether received or lost. This may create a large amount of overhead.

SUMMARY

A wireless transmit/receive unit (WTRU) may receive a downlink communication from a network over a first interface transmitted to one or more WTRUs in a group of WTRUs. The WTRU may determine an access class of the WTRU based on a packet loss percentage of the downlink communication. The access class may be associated with a contention window for accessing a second interface. The WTRU may transmit packet loss information to the one or more WTRUs over the second interface in the contention window. The WTRU may receive packet loss feedback from the one or more WTRUs over the second interface. The WTRU may determine that the access class of the WTRU is a highest class of the one or more WTRUs. The WTRU may transmit a single groupcast negative acknowledgement (gNACK) to the network on behalf of the one or more WTRUs over the first interface based on the packet loss feedback.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
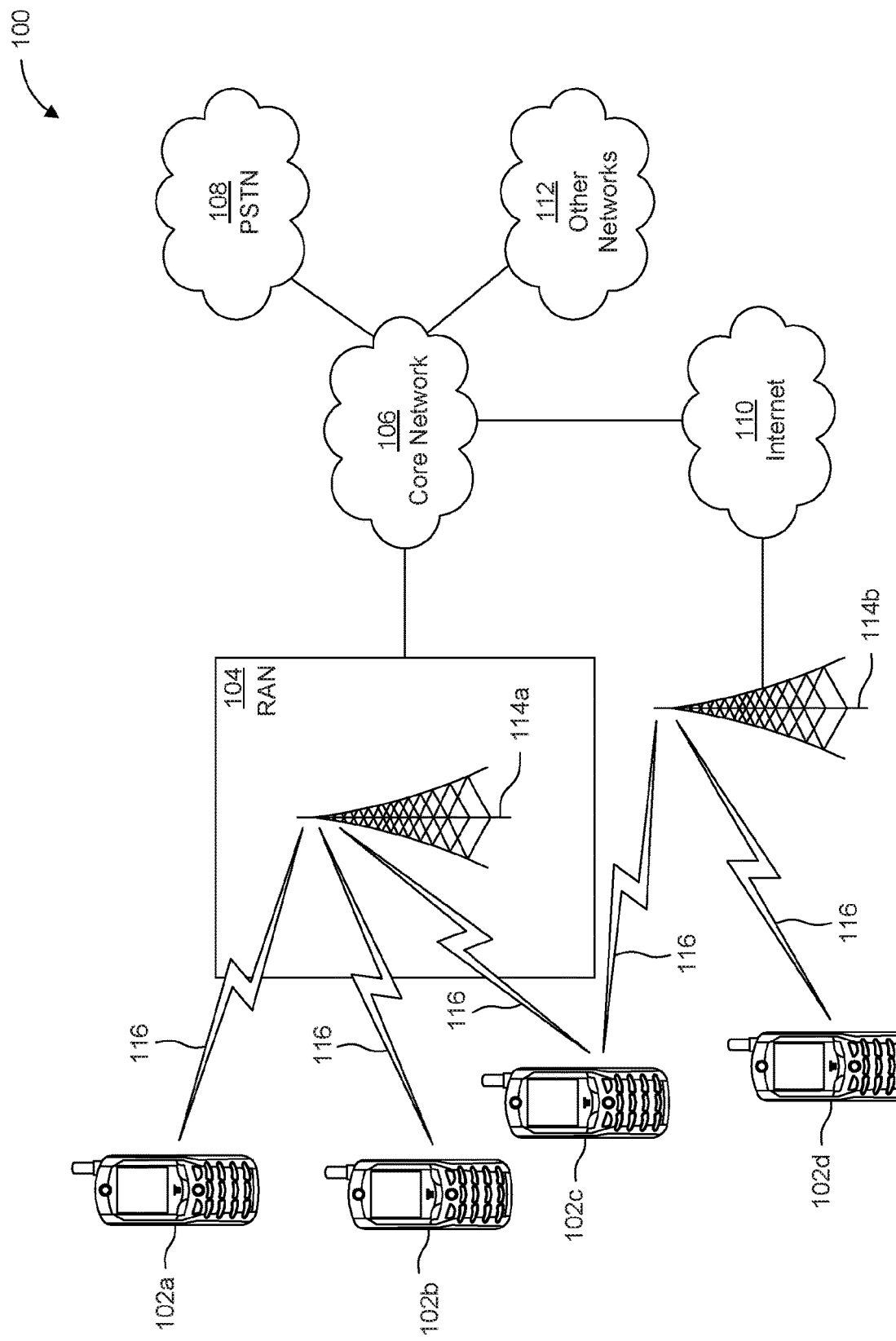
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
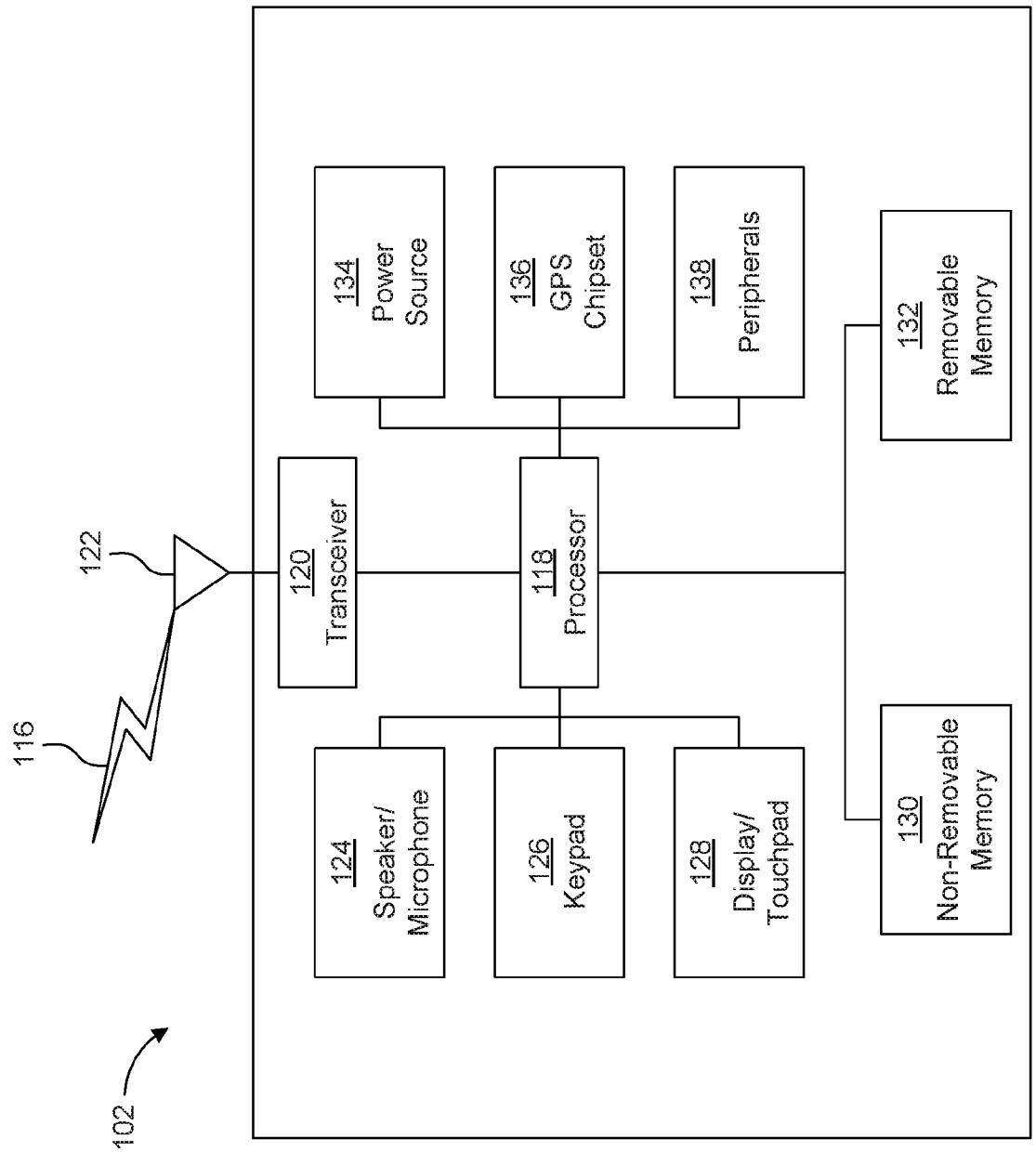
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
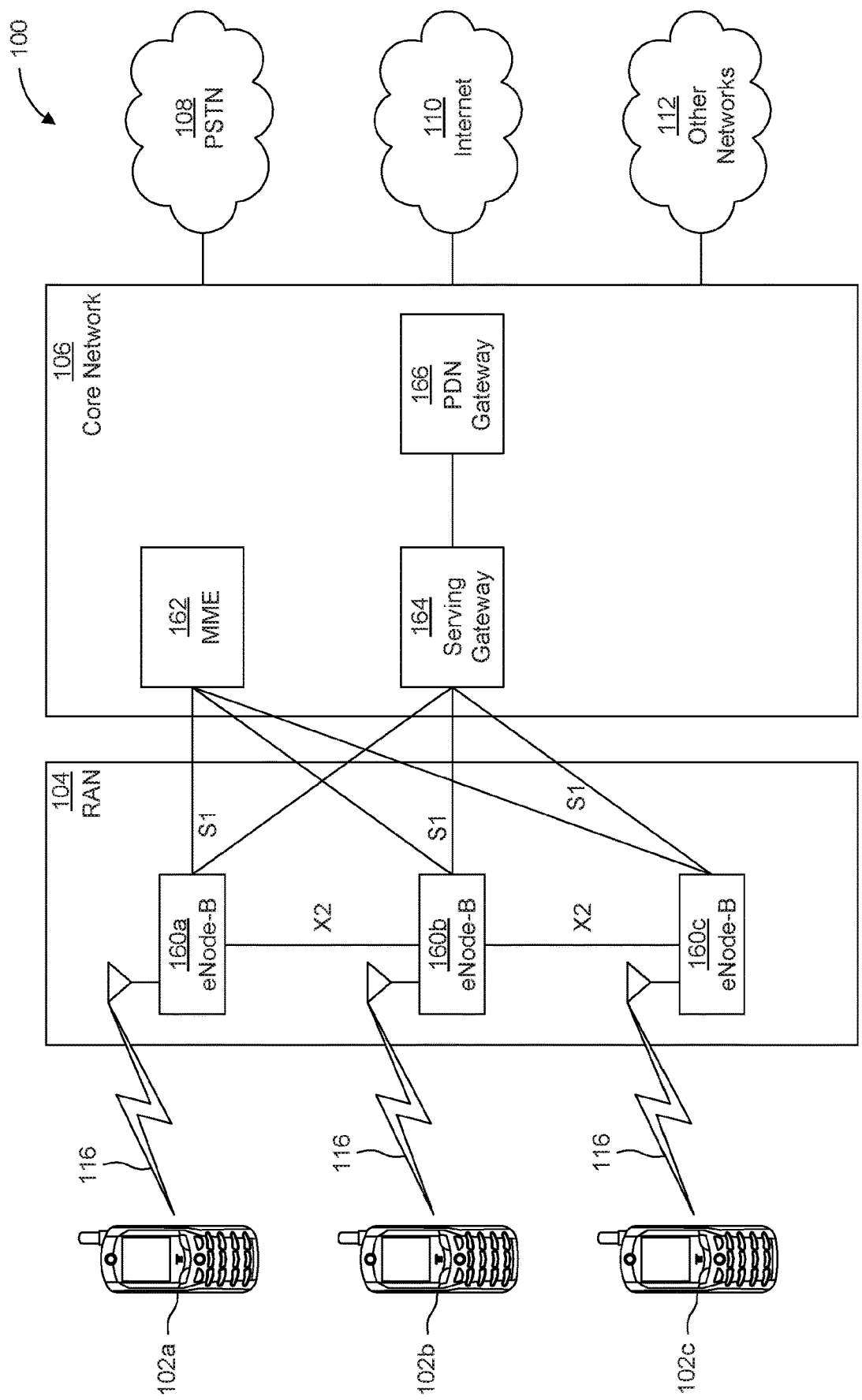
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
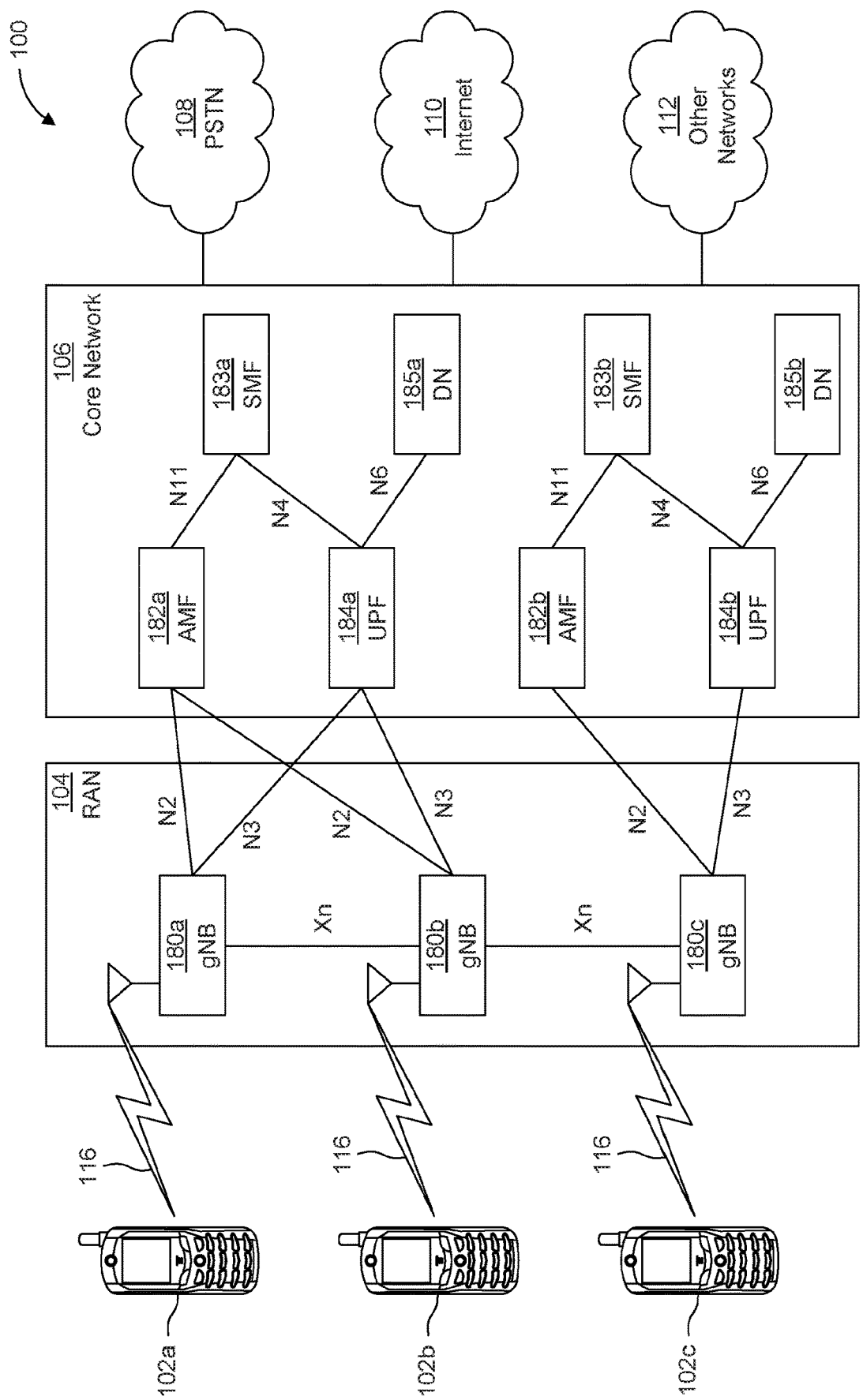
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Unmanned aerial vehicles (UAVs) may be deployed in a variety of applications, for example, parcel delivery, agriculture, oil and gas inspection, and cinematography. There have been several technological challenges that have been identified in the recent 3GPP Aerial Study Item from a communications perspective, where the expectation is to have UAVs coexist with terrestrial mobile users. One of the main differences in operational scenarios between UAVs and terrestrial users is that, the former is expected to operate at altitudes between 0 and 400 feet, while the latter operates anywhere up to 50 feet. The operational scenario for drones may have a wider altitude range and may experience heterogeneous channel propagation environments. Problems that have been identified by the Aerial Study Item on the coexistence of aerial and terrestrial users may include one or more of the following: uplink and/or downlink interference caused by and/or affecting aerial vehicles, optimizations of signaling aspects (e.g., measurement report, cell reselection triggers, handover/mobility aspects etc.,), and identification of aerial vehicles. The emphasis of the 3GPP study item thus far has been on the Uu interface between the UAVs and a network. Sidelink communications have been not been addressed. Sidelink communications in 3GPP have considered ProSe Direct Discovery, Direct Communication (since Rel-12), and V2X communication (since Rel-14).

One of the use cases that has been considered in the recent feasibility study of new technology markets is UAV to UAV collaboration, which may be done locally without network coordination. A group of UAVs may be deployed to accomplish a common mission. For example, a group of UAVs may search for a common intruder or suspect, continuously monitor of natural disasters, or perform autonomous surveys. In these scenarios, the common assumptions and its variants may be modeled, for example, based on one or more of the following scenarios.

There may be one UAV controller, such as a pilot, that manages all the UAVs in the group. For example, the pilot in control may provide a command & control message common to all members of the group through broadcast messaging, while providing member-specific restricted command & control message through unicast to one UAV.

UAVs may have the ability to autonomously form groups using sidelink communications. Alternately, the UAVs may belong to a particular group from a service level perspective, for example, nominated by a central controller. UAVs may have direct links to each other and also to the central controller.

One member of the UAV group may be deemed a head UAV, while other UAVs may be nominated as follower UAVs. The assignment of the head and follower UAVs may be determined jointly by the UAVs instantaneously, for example dynamically, based on a set of pre-specified rules and/or encountered conditions. Alternately, the head and followers may be statically chosen for a mission by a central controller. The route that a UAV group may need to follow for a mission may be pre-specified and deterministic.

Evolved multimedia broadcast and multicast service (eM-BMS) was introduced in Release 11 in 3GPP and may be used for broadcast/multicast service. The eMBMS communications may be a unidirectional service. Packets may be delivered from a source to a group of receivers and there may be no feedback sent to the source from any of the receivers.

One reason for the lack of feedback may be a high probability that there will be a member of the broadcast/multicast group to have not received a packet. This may particularly occur if the size of the broadcast/multicast group is reasonably large and each member of the group experiences independent channel conditions. Hence, for every packet transmitted by a source (e.g., eNB), the probability of re-transmitting the packet increases with increase in broadcast/multicast group size. Although the coding rate and modulation coding scheme (MCS) may be designed based on the weakest user in the group, there are no guarantees on packet reception by every member of the group. Further, retransmissions and conservative coding may lead to decreased spectral efficiency, especially for the stronger users in the group. In order to strike a balance between complexity in re-transmission that can be triggered due to a member of the group requesting for retransmission of the packet and reliability, there may be fixed number of re-transmissions performed by the source, irrespective of packet reception by the members of the group. This may lead to a decreased efficiency.

If there are multiple members in the group that have lost the same packets, there may be a flooding of negative acknowledgements (NACKs) that the source may have to handle. This may be due to the fact that a WTRU may not be aware of the packet loss scenario of the other WTRUs and may individually send feedback.

The File Delivery over Unidirectional Transport (FLUTE) protocol may be used to deliver a file using a unidirectional bearer. It may not be possible to guarantee error free reception over FLUTE. Accordingly, unicast schemes may be used to recover lost packets.

After a broadcast session is complete, the source may initiate a unicast session with each of the members of the broadcast/multicast group. Each member may provide a FLUTE level such as, for example, the application level and/or packet loss information. The source may retransmit only the lost packets to each member until successful delivery. Alternatively, if the packets are fountain coded, each member may provide only the number of packets lost, and may not have to let the source know which packets have been lost. The source may transmit a higher number of packets than the member requires, which may improve decodability of the file.

The physical downlink shared channel (PDSCH) may be used for unicast data transmission and the physical multicast channel (PMCH) may be used for evolved multimedia broadcast multicast service (eMBMS) transmission. The PDSCH may be multiplexed, both across time and frequency, while the PMCH may be multiplexed only across time. That is, the PDSCH may be allocated to users both across time and frequency, while this may not be possible with the PMCH. The PMCH may be switched only on a subframe level. The PMCH may be coordinated across multiple cells that constitute a multicast-broadcast single-frequency network (MBSFN) area. It may be difficult to assure uniformity in resource allocation from a total resource block (PRB) perspective of all the cells in the MBSFN area due to independent unicast resource allocation that each eNB is likely to have. The granularity of resource allocation on the PMCH may be coarse at a sub-frame level, which may lead to poor resource utilization. For example, if the broadcast rate is low, or if users are moving across cells in which multicast transmission may be performed, invoking eMBMS service may not be efficient due to the requirement of coordinating all the eNBs at the sub-frame level. Single cell-point to multicast (SC-PTM) may address this, whereby each cell may independently use its PDSCH to service both broadcast/multicast as well as unicast.

Schemes for broadcast/multicast may use conservative coding rates, MCS, and fixed re-transmissions to enhance packet decodability in broadcast. Further, unicast may be used to re-transmit lost packets to members of the broadcast/multicast group. There may be a need in finding optimal transmission schemes for packet losses using network/index-coding.

Protocols in which members of a broadcast/multicast group may perform group cooperation leveraging the presence of sidelink/WiFi-direct communications to improve packet repair efficiency of a broadcast/multicast Uu communication and spectral efficiency are described herein.

Figure 2:
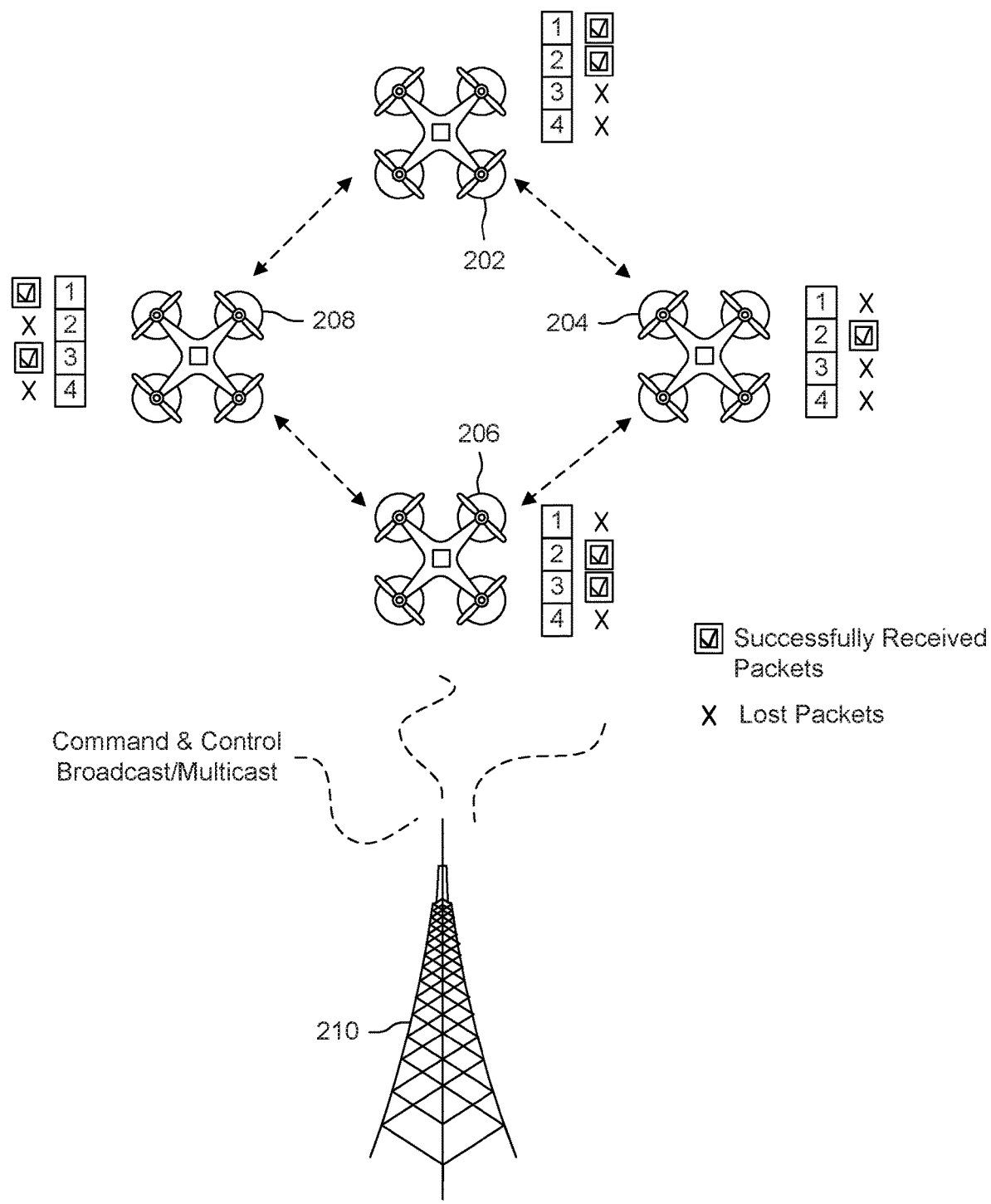
FIG. 2 shows unmanned aerial vehicle (UAV) grouping.

FIG. 2 illustrates a concept of UAV grouping. An example UAV group may include a first UAV 202, a second UAV 204, a third UAV 206, and a fourth UAV 208, which may be deployed to accomplish a common mission. The members of the group may receive a common command & control (C2) message that may be provided by a UAV traffic management (UTM) controller, or pilot, and may be transmitted via multicast by an eNB 210. The eNB 210 may communicate with one or more of the first UAV 202, the second UAV 204, the third UAV 206, and the fourth UAV 208 over a Uu interface. The eNB 210 may configure a group radio network temporary identifier (G-RNTI) for the group of UAVs in order to transmit a common group-specific C2. The group-specific C2 may be a single transmission on the downlink that every member of the group sharing the G-RNTI may decode. Due to independent channel conditions experienced by each member of the group, the packets lost and received may be different for each other member of the group. The difference in packets lost and received by different group members may be locally exploited. For example, one member of a group may send its received packet to another member that lost this packet using device to device or vehicle to vehicle (D2DN2V) sidelink communication.

For example, the variable $B_i$ may represent the packets lost by member i of the group, the variable S may represent the packets transmitted by the eNB, and the variable $\cup$ may represent the number of members in the group. The set of lost packets, L, by the group may be $$L := [S \backslash \cup_i \{B_i\}] \approx \emptyset \text{ as } \cup \text{ grows large.} \qquad \text{Equation 1}$$

The set of lost packets, L, by the group may go to zero (i.e., null-set) as u increases because there may be at least one member of the group that likely receives a packet transmitted by the eNB.

In the UAV group shown in FIG. 2, $$S=\{1,2,3,4\}, B_1=\{3,4\}, B_2=\{1,3,4\}, B_3=\{1,4\},\\ B_4=\{2,4\} \text{ and } L=\{4\}. \quad\quad \text{Equation 2}$$

In this example, the packet {4}, may not be received by any member of the UAV group, while the other packets {1,2,3}, may be received by one or more members of the UAV group. Packets {1,2,3} may be locally recovered among the members of the group, thereby avoiding members of the group having to rely on the eNB to retransmit the packets by unicast or multicast. However, because packet {4} was not received by any member of the group, it may not be recovered locally.

In order to recover lost Uu packets through sidelink, each member may need to be aware of the packet lost/received information of the other group members. A protocol may be used so that the packet loss information of every member is shared with other group members efficiently. Once every member is aware of the packets lost or received by the other members, a protocol may be used for sidelink based packet repair in which packets may be efficiently exchanged among members so that every member may obtain its lost packets directly from another member. Sidelink channels may be implemented using specific protocols such as IEEE 802.11 or V2V.

The protocols used for Sidelink Assisted Downlink Broadcast (SADB), may include groupcast NACK (gNACK) transmission, efficient protocol for packet loss dissemination among group members, and efficient protocol for packet repair among group members.

In SADB, a group member may obtain lost packets from another member of the group, instead of having network infrastructure (e.g., the eNB) re-transmit the packets. In some instances, re-transmissions in a broadcast/multicast may not be permitted, for example in a layer of the 3GPP and/or IEEE 802.11 protocol stack. However, errors that occur in broadcast transmissions may be corrected by unicast mechanisms such as FLUTE.

In SADB, downlink broadcast packets lost by a group member may be available from another member of the group. The packet losses experienced by group members may be independent, such that a lost packet from one member may be available from at least one other group member. The SADB protocol may be built at the application layer over user datagram protocol/internet protocol (UDP/IP) and may be independent of lower layers. The SADB protocol may also be built on lower layers such as the packet data convergence protocol (PDCP), the radio link control (RLC), and the media access control/physical (MAC/PHY) layer. The PDCP implementation for SADB may be similar to application level implementation. The RLC implementation of SADB may require the RLC layer to transmit in acknowledged mode, which may incur overhead, as packets may need to be re-transmitted even if only one of the group members loses a packet. Application level protocol for SADB may be considered below.

As shown in FIG. 2, packet {4} may be lost by all of the group members. It may not be possible to repair the packet through sidelink based local cooperation. A gNACK may be transmitted by any member of the group to indicate that a packet has not been received. The gNACK message may indicate that packet {4} was not received not only by the transmitting member, but also by all of the group members.

One way to determine the common packets lost by all group members may be for each member to broadcast its packet lost/received information locally to its group members. A pre-specified ordering of users that every user has to follow to access the channel at a particular time slot (e.g., a time slot/frequency resource that a user should use for broadcasting its loss/received information) may be used. One advantage of using pre-specified channel access mechanisms may be collision avoidance. Packet status information (e.g., received and lost information) may be known to members of the group.

There may be N group members and each member may transmit status information on each of n packets. A common frequency resource, for example, a packet status transmission resource pool may be available. This scheme may use N time resources with a total number of Nn bits to obtain global information on each of the packets of each member in the group.

Table 1 shows packet status information for six packets (P1-P6) received by a downlink broadcast for three users (U1, U2, U3). In Table 1, a value of 1 represents packets successfully received and a value of 0 represents lost packets.

TABLE 1

Packet Status Information

|    | P1 | P2 | P3 | P4 | P5 | P6 |
|----|----|----|----|----|----|----|
| U1 | 0  | 0  | 1  | 1  | 1  | 1  |
| U2 | 1  | 0  | 1  | 0  | 0  | 0  |
| U3 | 1  | 0  | 0  | 0  | 0  | 0  |

Each user may transmit the status of each packet that has not been reported in a pre-specified packet order (e.g., increasing packet sequence number). The first user U1 may have to transmit six bits to indicate the status of six packets. The second user U2 may only have to transmit the status of the packets that were reported to be lost by the first user because only the lost packets may be of interest. There may be a lead time (e.g., 4 subframes) after each user transmits so that other members may receive the message and prepare their own packet status information accordingly. For example, if U2 transmits second, then it may report the status of packets not received by U1 in a pre-specified order (e.g., increasing packet sequence number) which, may be {P1, P2}, incurring 2 bits. The third user U3 may need to report the status of only the packets reported to have been lost by both U1 and U2. If U3 transmits third it may provide the status of {P2}, which incurs one bit. After U3 transmits, it may become clear which packet was not received by all the users. Accordingly, the number of bits required for transmission may be: 6+2+1=9 bits.

Table 2 illustrates the number of bits required for gNACK determination for different user transmission orders.

TABLE 2

Number of Bits Required

| Order of transmission | # bits required |
|-----------------------|-----------------|
| U1, U2, U3            | 6 + 2 + 1 = 9   |
| U1, U3, U2            | 6 + 2 + 1 = 9   |
| U3, U1, U2            | 6 + 5 + 1 = 12  |

TABLE 2-continued

Number of Bits Required

| Order of transmission | # bits required |
|---|---|
| U3, U2, U1 | 6 + 5 + 4 = 15 |
| U2, U1, U3 | 6 + 4 + 1 = 11 |
| U2, U3, U1 | 6 + 4 + 4 = 14 |

The order of transmission may play an important role in optimizing the total number of bits required to disseminate the gNACK information. It may be advantageous for the user with the maximum number of correctly received packets to transmit first and have a higher transmission priority. The user that transmits first may have to provide status information of all packets, irrespective of how many it has correctly received. Users that transmit subsequently may provide only the difference information. It may be desirable to provide maximum information on the reception of previously unreported received packets at every transmission instant.

Due to the distributed framework, it may not be possible for a group member to know whether it has the most number of received packets. Hence there may need to be a mechanism where the group members, implicitly, may be able to determine the number of received packets as compared to other members of the group. This concept may be the basis of the gNACK protocol which may be a priority based probabilistic schema that leverages the aforementioned observations.

The gNACK protocol may proceed in blocks of n packets, $P=(\{1, 2 \ldots n\})$ received through downlink broadcast. For a group of size N, the variable $A_i$ may denote the packets received by user-i, and the variable $P_i^e$ may denote the loss percentage of user-i. The users may be categorized into different access classes, based on loss percentage. An example categorization of users into access class is shown in Table 3.

TABLE 3

Access Class Categorization

| Class/Priority | Loss Percentage | Contention Window Minimum (CWmin) | Contention Window Maximum (CWmax) |
|---|---|---|---|
| Class-1 | $P_i^e < 1\%$ | 0 | 7 |
| Class-2 | $1\% \leq P_i^e < 5\%$ | 8 | 31 |
| Class-3 | $5\% \leq P_i^e < 15\%$ | 32 | 127 |

Users that have the least packet losses may be given the highest priority to access the channel. For example, users that have $P_i^e < 1\%$ may be assigned to Class-1. Class-1 may have the minimum access delay to a channel, as seen by the contention window range.

The contention window range for an access class may be defined to be $$CW_i = [CWmin_i, CWmax_i] \quad \text{Equation 3}$$

and may be non-overlapping across different classes, for example $CW_i \nsubseteq CW_{i+1}$, such that $$CWmin_{i+1} > CWmax_i > CWmin_i. \quad \text{Equation 4}$$

The back off range for access class-i can be less than class-(i+1) so as to provide access advantage for higher priority classes. If multiple users fall into the same access class, then the users may randomly choose their back off time according to the access class's specific contention window range.

Initialization of the gNACK protocol may include setting $Y=\{\emptyset\}$ to be the set of packets that has been reported to be correctly received by the group. In a first step, $P_i^e$ may be calculated from $A_i$, $\forall i=1, 2, \ldots N$. Every member may be assigned to an access class based on the procedure described above in Error! Reference source not found. In step 2, group member-k, that has chosen the least back off time based on its access class assignment may access the channel and broadcasts its list of received packets $A_k$ to all members. In step 3, $Y=Y \cup A_k$ may be computed and $A_k=\emptyset$ may be set. In step 4, $i=1, 2, \ldots N$, $A_i=(A_i \cap (P \setminus Y))$ may be updated for all members. In step 5, steps 1 through 4 may be repeated until $A_i=\emptyset$, $\forall i=1, 2 \ldots N$. In step 6, gNACK=P\Y may be computed.

An application level use case of this protocol may be in video broadcasting, where group RTCP feedback may be sent by any of the clients indicating RTP packets that none of the clients have received.

Referring to the packet loss scenario of Table 1, users may be assigned to class-1, if (packet error <0.35); class-2, if (0.35<packet error <0.65); class-3, if (0.67<packet error <1). A gNACK protocol may be initialized by setting=$\{\emptyset\}$, $P=\{1, 2,3,4,5,6\}$ $A_1=\{3,4,5,6\}$, $A_2=\{1,3\}$, $A_3=\{1\}$.

In step 1 of a first iteration, $P_1^e=0.33$; $P_2^e=0.66$, $P_3^e=0.83$. User-1 may be assigned to class-1, user-2 may be assigned to class-2, and user-3 may be assigned to class-3. User-1 may access the channel. In step 2 of the first iteration, $A_1=\{3,4,5,6\}$. In step 3 of the first iteration: $Y=\{3,4,5,6\}$; $A_1=\{\emptyset\}$. In step 4 of the first iteration, $P\setminus Y=\{1,2\}$; $A_2=\{1\}$; $A_3=\{1\}$.

In step 1 of a second iteration, user-2 and user-3 may have new error rates of 5/6 as both have only packet-1 (see step 4 from the first iteration). Hence, they may be assigned to class-3. User-2 may select a lower backoff and it may access the channel before user-3. In step 2 of the second iteration, $A_2=\{1\}$. In step 3 of the second iteration, $Y=\{1,3,4,5,6\}$; $A_2=\{\emptyset\}$. In step 4 of the second iteration, $P\setminus Y=\{2\}$; $A_3=\{\emptyset\}$. Hence, $P\setminus Y=\{2\}$.

In a MAC/PHY layer approach to gNACK, a broadcast/multicast transmission may be associated with a group-specific G-RNTI that the users of a broadcast/multicast group may use to decode the broadcast packets sent by the eNB. A user specific cell radio network temporary identifier (C-RNTI) may also be used to decode unicast packets. The following description includes frame/sub-frame timing, how gNACK feedback differs from unicast feedback, and parameters that may influence its design.

Figure 3:
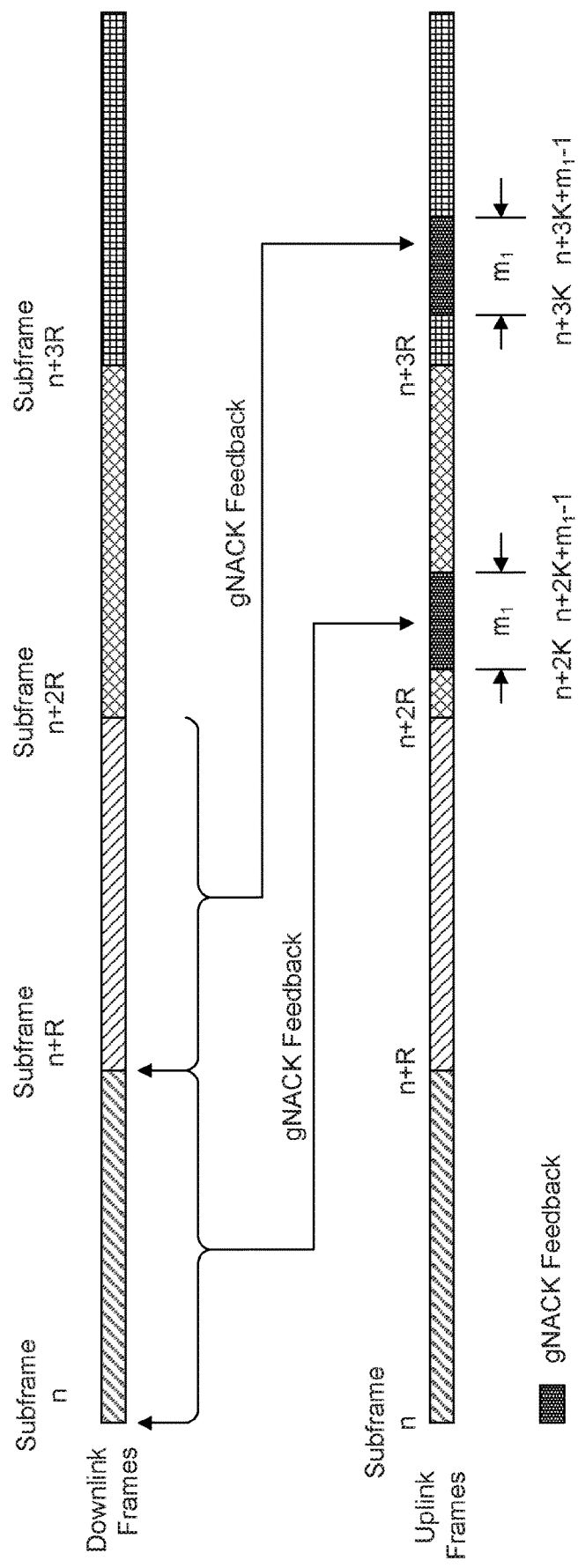
FIG. 3 shows downlink and uplink subframe timings for groupcast negative acknowledgment (gNACK) feedback.

FIG. 3 shows downlink and uplink subframe timings for gNACK feedback. The gNACK protocol may proceed in blocks of R subframes. The gNACK feedback for downlink sub-frames of length R may be sent K sub-frames later in the uplink. In this example, it is assumed that K>R. As shown in FIG. 3, gNACK feedback for downlink sub-frames [n, (n+R−1)] may be sent out at uplink frame (n+2K), while gNACK feedback for downlink sub-frames [(n+R), (n+2R−1)] may be sent out at uplink frame (n+3K).

The parameter K may denote the delay that may be required for sending out a gNACK and may depend on the number of members, N, in the group. If a larger number of members participate in group communications, the time required to determine gNACK may become higher. To ensure gNACK feedback is not delayed excessively, the eNB may limit the group size N to an acceptable number. If the group size exceeds the acceptable and dimensioned number, the eNB may choose to form more than one group. In this situation, two or more G-RNTIs may be allocated for each group and its dependent members.

The parameter R may denote the number of subframes over which gNACK is sought. In eMBMS, broadcast scheduling may not be performed on every sub-frame. The number of broadcast packets scheduled in R sub-frames may be all of the information needed for the gNACK protocol.

The variable d may be the maximum number of HARQ processes defined for a group specific broadcast/multicast transmission. Hence for gNACK generation, d may need to be adaptable depending on the R (number of broadcast scheduled subframes) and K (delay parameter for sending gNACK). Although the maximum number of HARQ processes d may be an increasing function of both R and K, the need for increased buffering at the eNB may be group-specific and not user-specific. For user-specific NACK for broadcast transmissions, the buffer requirements may be much more than the buffer requirements for the gNACK scheme. In the case of user-specific NACK for broadcast transmission, some users may have more packet losses than others, and the eNB may have to buffer packets based on the user with the highest packet loss.

The HARQ feedback in unicast scenarios may only require one or two bits depending on whether it is single or double layer. In the uplink, the eNB may be aware of the unique HARQ process for which it is expecting feedback from the WTRU. However, in the case of gNACK, the feedback may indicate the explicit HARQ processes that may have been received in error. If gNACK is attempted every x HARQ processes, the feedback for a single HARQ process may be $\lceil \log_2 x \rceil$ bits.

As shown in FIG. 3, the gNACK feedback for downlink sub-frames [n, (n+R−1)] may be sent out in $m_1$ uplink frames [n+2K, (n+2K+$m_1$−1)]. Assuming that two bits are allocated per sub-frame for sending gNACK feedback on the PUCCH, gNACK feedback may be sent up to a total of $$\left\lfloor \frac{2m_1}{\log_2 x} \right\rfloor$$

HARQ processes. The starting sub-frame in the uplink and the number of sub-frames ($m_1$) for sending gNACK may be signaled by the eNB. The PUCCH resources that need to be used by WTRUs for sending gNACK may be based on the starting control channel element (CCE) location in the PDCCH used for signaling broadcast/multicast related downlink control information (DCI) for example, in the case of SC-PTM.

Alternately, the eNB may signal the starting resource ($x_1$) for the G-RNTI, and the WTRU may compute the resource locations as follows:

$$n_{PUCCH,j}^1 = x_1 + N_{PUCCH}^1;\ n_{PUCCH,j+1}^1 = x_1 + N_{PUCCH}^1 + 1 \qquad \text{Equation 5}$$

The WTRU may provide up to 4 bits of feedback on two consecutive PUCCH resources (j and j+1) on current sub-frame and this pattern may continue for one fourth of $$\left\lfloor \frac{2m_1}{\log_2 x} \right\rfloor$$

consecutive subframes. $N_{PUCCH}^1$ for gNACK resource location may be configured by higher layers, or be obtained through system information broadcast messages.

The PUCCH resources to be used for sending gNACK may be group-specific and not WTRU-specific. The group member that needs to transmit gNACK, which may be identified by C-RNTI, may be pre-specified, or may be signaled by the eNB. The eNB may use the G-RNTI to re-transmit, or broadcast, the lost packet to the entire group, as none of the group members may have the gNACK packet. Alternatively, the eNB may perform a unicast to any member of the group with the additional signaling indicating that the re-transmitted packet is associated with the G-RNTI and that recipient may need to perform sidelink broadcast of this packet to other group members.

The size of gNACK uplink feedback may be dependent on the number of group members, N, for example, the number of uplink sub-frames $m_1$ and the number of feedback bits per sub-frame. The probability that a packet is not available with any of the group member may decrease with an increasing N. Hence the eNB may adapt the number of uplink sub-frames $m_1$ and the number of feedback bits per sub-frame dynamically based on the number of current group members, N.

A gNACK may be sent for a group, and not on per-WTRU basis. A packet may have been received by some member of the group with a high probability, and so the probability that a packet is lost by all members may be small. The variable $B_i$ may denote the set of packets lost by member-i. A guideline for using the gNACK scheme may be:

$$|\{\cap_i B_i\}| \ll |\{\cup_i B_i\}|, \qquad \text{Equation 6}$$

where |(.)| may denote the cardinality. That is, the number of common packets lost by all members of the group may be much less than the union of the packet losses incurred by the group. Further, a gNACK may be transmitted on blocks of R subframes. This scheme may avoid the overhead of having to send feedback on a sub-frame basis by leveraging the fact that the probability that all the members lose a packet on a sub-frame may be small.

On the other hand, the following, $$|\{\cap_i B_i\}| \approx |\{\cup_i B_i\}| \qquad \text{Equation 7}$$

may imply that roughly each packet may be lost by every member with high probability, and it may not be possible to reconcile lost packets using sidelink communications. In this regime, acknowledgement/negative acknowledgement (ACK/NACK) may be performed instantaneously. There may be several procedures for users to receive or send feedback on a lost packet.

For all the users in the same G-RNTI (broadcast/multicast), the eNB may allocate a common resource element in the PUCCH which is signaled to the group members at connection setup. All the users may use the common resource to send feedback if they have a packet loss (i.e., a NACK).

Every user may send the feedback using the same signaled common resource, for example energy or sequence, if the packet was incorrectly received. All users may send the feedback in uplink frame n for a broadcast packet that was received in downlink frame (n−4).

Depending on the number of members that have not decoded the packet and are transmitting NACK, the received energy, as sensed by the eNB, may vary. For example, if the group members transmit a unique signal in case of NACK, the received energy as sensed by the eNB may be Nx, where N may represent the number of members transmitting NACK at a particular transmission time interval (TTI) and x may be the transmitted NACK sequence.

The eNB may sense the energy of the common resource to estimate how many users may have received the packet incorrectly. For example, the received energy in the common resource (E) may be checked against different thresholds to come up with an estimation as follows. If E>Threshold1, all group members may have sent a NACK in the common resource. If Threshold2<E<Threshold3, half of the members may have sent NACK in the common resource. If Threshold4<E<Threshold5, 1/5 of the members may have sent NACK in the common resource. The thresholds may be set taking into account the number of members in the group, a power p the eNB signaled for NACK transmission, and the path loss/expected fading profile of the group members.

One common resource element may be used by all group members to send an energy/sequence feedback. Alternately, multiple resource elements may be allocated, wherein, mutually exclusive subsets of group members may be allocated unique resource elements for energy transmission. For example, group member 1 and member 2 may both be allocated a common resource element $f_1$, while group member 3 and member 4 may both be allocated a different common resource element, $f_2$, for energy transmission. This may provide finer information on the packet loss scenario experienced by the group members to the eNB. Extending this procedure, whereby unique resource elements are allocated to mutually exclusive subsets of group members of size one, may reduce to the per-WTRU feedback.

WTRUs/UAVs belonging to a specific G-RNTI may be divided into a total of K sub-groups of size $c_k$ (k=1, 2 . . . K). Each sub-group may be assigned a unique PUCCH resource $Y_k$ (k=1, 2 . . . K) by the eNB to transmit the gNACK. The WTRU/UAV, and the eNB protocol may be as follows. Each member of sub-group k may use the common assigned resource $Y_k$ to transmit if a NACK is being sent. The eNB may decode the presence of NACK in resources $Y_k$ (k=1, 2 . . . K) and may retransmit the packet if it decodes NACK in all the K resources.

The sub-group gNACK PUCCH resource assignment $Y_k$ for a WTRU/UAV may be done using RRC reconfiguration when the UE/UAV is assigned GRNTI as shown in Table 4 below.

TABLE 4

GRNTI Assignment

```
c1 ::= CHOICE [rrcConnectionReconfiguration]
   rrcConnectionReconfiguration ::= SEQUENCE
   rrc-TransactionIdentifier ::= INTEGER (0 . . . 3) [0]
setup ::= SEQUENCE
   G-RNTI ::= BIT STRING SIZE(16) [0000001111111111]
   subgroup PUCCH gNACK-Index ::= CHOICE [indexOfFormat3]
```

Group members may operate in a correlated packet loss regime, which may satisfy $|\{\cap_i B_i\}| \approx |\{\cup_i B_i\}|$. Group members may operate in an independent packet loss regime, which may satisfy $|\{\cap_i B_i\}| \ll |\{=_i B_i\}|$. Depending on the energy sensing approach used over a period of time (e.g., several subframes/frames), the eNB may signal through DCI or a higher layer signaling, the mode of packet loss recovery the members of a group may need to follow.

As described above, priority may be assigned to users for accessing the channel based on the loss probability. A higher priority may be assigned to members with less packet loss. Alternatively, higher priority may be assigned to members with high packet losses to maximize the packet loss dissemination information among group members, given a fixed amount of transmission opportunities. The set of packet losses experienced by users that have less packet losses may be a subset of packet losses experienced by users that have higher losses. It may be optimal for group members to report the difference in lost packet information. An example for access class determination for this scenario is provided in Table 5, which shows an example categorization of users into access class and contention window minimum and maximum for each access class for packet loss dissemination with fixed transmission opportunity.

TABLE 5

User Categorization

| Class/Priority | Loss Percentage | Contention Window Minimum (CWmin) | Contention Window Maximum (CWmax) |
|---|---|---|---|
| Class-1 | $P_i^e > 25\%$ | 0 | 7 |
| Class-2 | $10\% \leq P_i^e < 25\%$ | 8 | 31 |
| Class-3 | $0 < P_i^e < 10\%$ | 32 | 127 |

Figure 4:
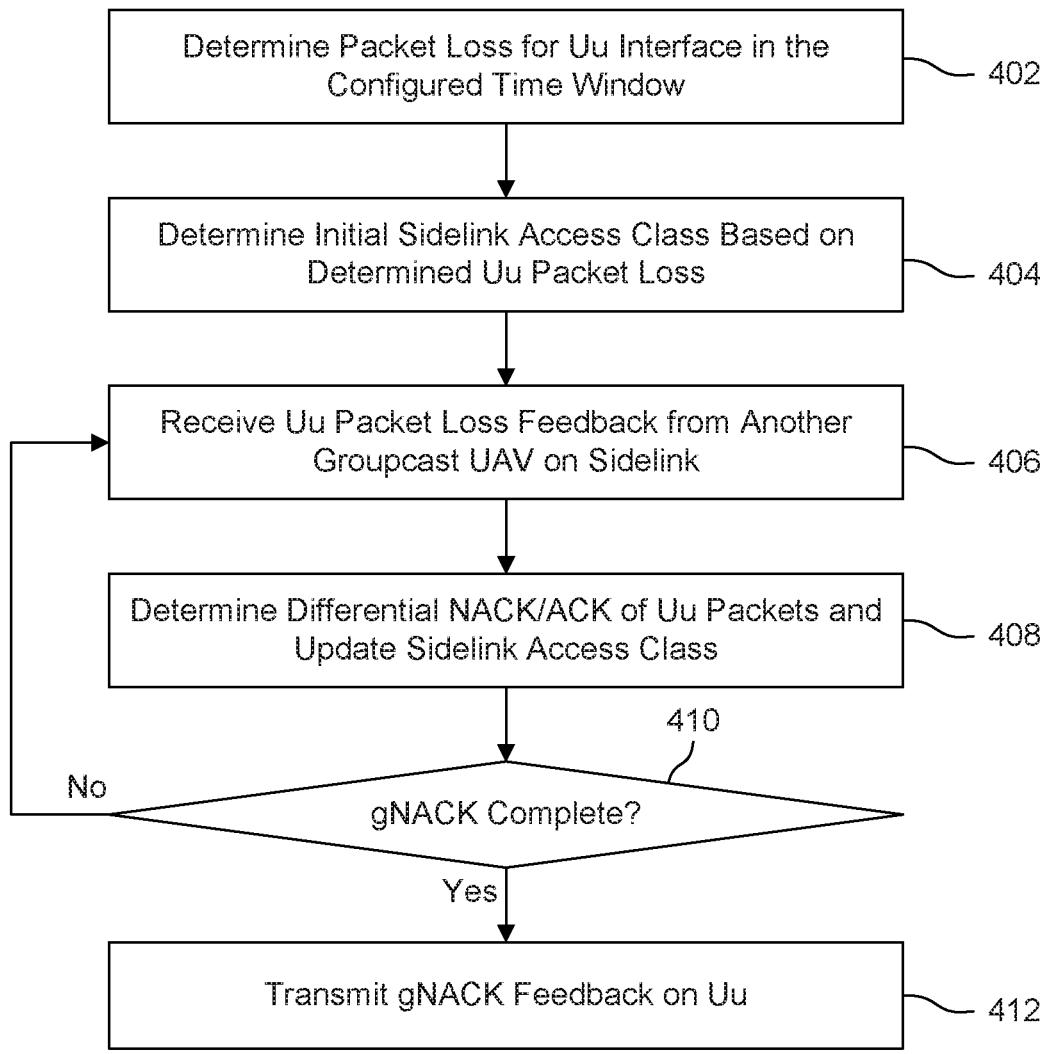
FIG. 4 is a flowchart illustrating gNACK determination.

FIG. 4 is a flowchart illustrating the gNACK determination process. In step 402, a UAV may determine packet loss for the Uu interface between the UAV and the eNB in the configured time window. In step 404, the UAV may determine an initial sidelink access class based on its determined Uu packet loss. In step 406, the UAV may receive Uu packet loss information from other members of its group over sidelink communications. In step 408, the UAV may determine a differential NACK/ACK of Uu packets within the group and may update its access class for sidelink communications. In step 410, the UAV may determine if gNACK is complete. If gNACK is not complete, the process may return to step 406. If gNACK is complete, the process may proceed to step 412. In step 412, the UAV may transmit a single gNACK to the eNB over the Uu interface. The gNACK may reflect a coordinated NACK across the group based on the differential NACK/ACK of Uu packets within the group.

In group packet repair, each member of the group may know the packet loss of all other members, and how each member can assist other members so that all members are able to reconcile their lost packets.

This procedure may require packet loss/received information of every packet for every group member. However gNACK protocol may not be able to provide information on every packet for each member, as it is designed for each member to provide the maximum unreported difference information. Each member may provide information on every packet which incurs a maximum overhead of Nn bits transmitted, where N may be the number of group members, and n may be the number of packets for which the lost/received information is to be reported.

In group packet repair, it may be desirable to optimize ways by which all group members obtain their lost packets in the minimum amount of transmission time possible. In addition, it may be desirable, given fixed transmission opportunities, to maximize the amount of packets that can be repaired for the whole group.

Figure 5A:
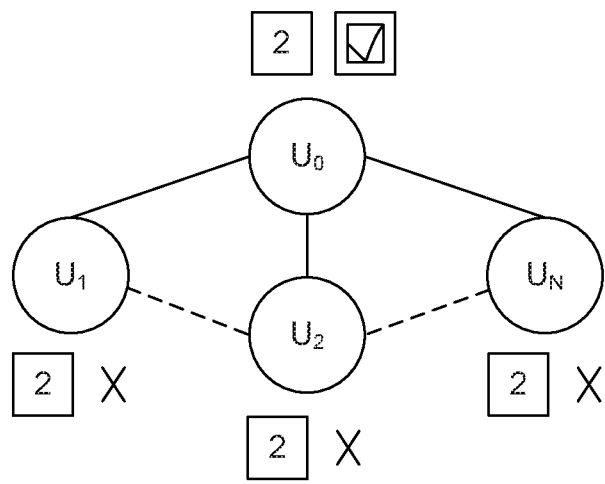
FIG. 5A shows a simple broadcast, wherein the same packet is requested by many members.
Figure 5B:
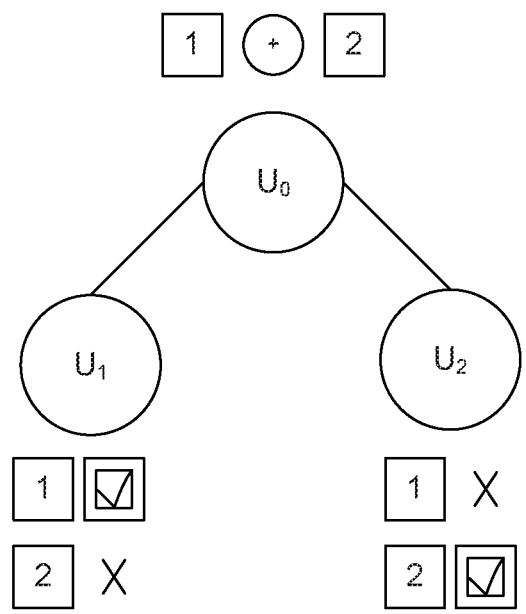
FIG. 5B shows loss patterns for a two packet network coding.
Figure 5C:
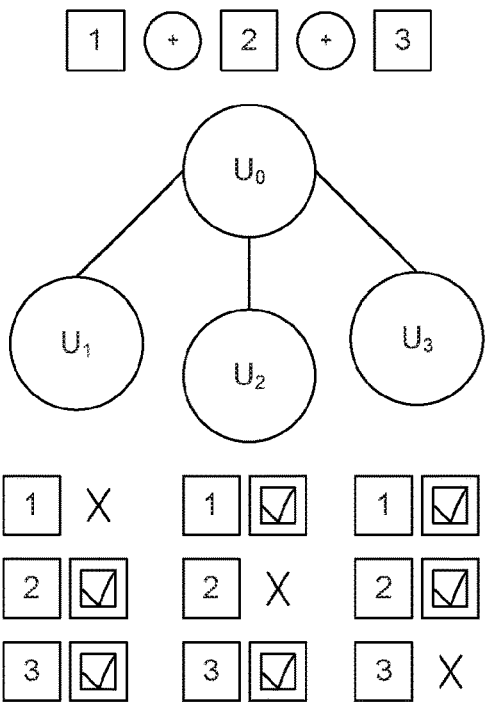
FIG. 5C shows loss patterns for a three packet network coding.
Figure 5D:
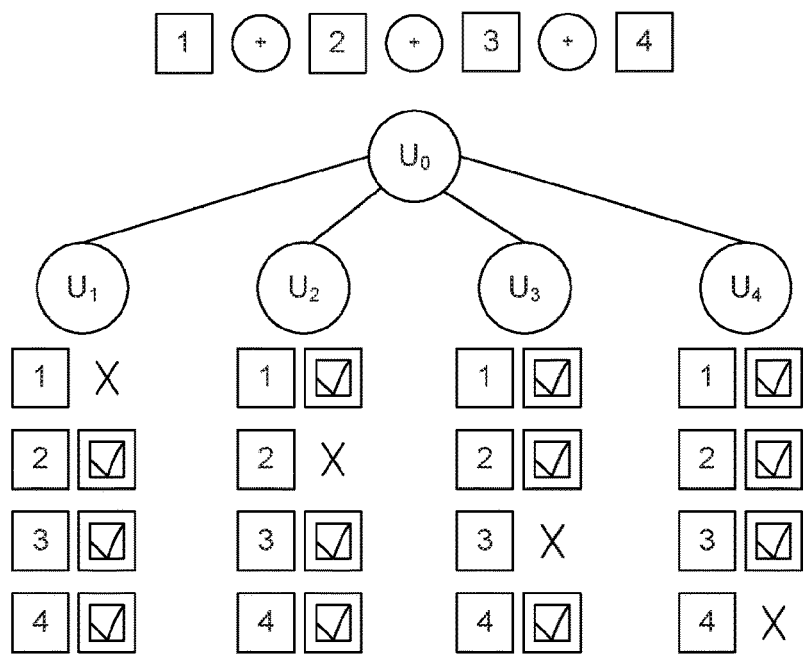
FIG. 5D shows loss patterns for a four packet network coding.

FIGS. 5A-5D show examples of group packet repair. Group members may be able to help others based on the packet losses experienced by other members and the availability of the lost packet at a member that wants to help. FIG. 5A shows a simple broadcast, wherein the same packet is requested by many members. FIG. 5B shows loss patterns for a two packet network coding. FIG. 5C shows loss patterns for a three packet network coding. FIG. 5D shows loss patterns for a four packet network coding.

A group member may determine how many group members may be simultaneously served in one transmission opportunity. This may depend on the packet losses experienced by other group members and the availability of the lost packet with the group member that wants to help. In FIG. 5A, the same packet (packet #2) may be lost by members $U_1, \ldots U_N$, and this packet may be available with another member, $U_0$. Hence one transmission may be sufficient to repair all users, N users, with this packet loss.

In FIG. 5B, $U_1$ may receive packet-1 and may lose packet-2, while the reverse scenario exists for $U_2$. Another member, $U_0$ that received both packet-1 and packet-2 may broadcast exclusive or XOR of these packets. Accordingly, it may be possible to repair the packet losses of both members $U_1$, $U_2$ simultaneously with a single transmission.

In FIG. 5C, $U_1$ may lose packet-1, but may receive the other two, $U_2$ may lose packet-2, but may receive the other two, $U_3$ may lose packet-3, but may receive the other two, and $U_0$ may receive all the packets. It may be possible to repair packet losses of three members $U_1$, $U_2$, $U_3$ simultaneously with a single transmission.

In FIG. 5D, four members may be served in one transmission. It may be possible to simultaneously serve multiple members in one transmission opportunity by carefully considering the lost packet patterns of group members. The variable l may be the number of users that can be simultaneously served by a group member and N may be the total numbers of group members. An example for access class determination of group members for packet repair phase is shown in Table 6.

TABLE 6

Categorization of Users

| Class/Priority | # Packet repair candidates | Contention Window Minimum (CWmin) | Contention Window Maximum (CWmax) |
|---|---|---|---|
| Class-1 | $\ell > \lfloor 0.75\,N \rfloor$ | 0 | 7 |
| Class-2 | $\lfloor 0.25\,N \rfloor < \ell < \lfloor 0.75\,N \rfloor$ | 8 | 31 |
| Class-3 | $0 < \ell < \lfloor 0.25\,N \rfloor$ | 32 | 127 |

In order to signal a network coded packet, the MAC header may indicate the sequence number (e.g., media access control protocol data unit (MPDU) sequence numbers) of the packets that have been used to form the network coded packet. As the group members may use a network code in the sidelink, the MAC packet header for the sidelink may have bits allocated for representing the sequence number for the MPDUs that may have been used to form the network code in addition to the existing bit allocation for representing the sequence number for the current MPDU. The MAC packet header updates required to enable network coding may only be performed for sidelink communications.

Group members may transmit randomly. Each group member may be assigned to transmit a specific set of packets in each iteration. The assigned set of packets may not have been received correctly by the member. In this case, other members may end up transmitting this packet in a different iteration.

In an example there may be N members numbered $\{0,1, \ldots N-1\}$ and M packets numbered $\{0,1, \ldots M-1\}$. User-j may transmit packet k, if k satisfies the following:

$$k = (mN + (j + \Delta) \bmod N) \bmod M, \; \forall \, m = 0, 1, \ldots \left\lceil \frac{M}{N} \right\rceil - 1 \quad \text{Equation 8}$$

$$\Delta = 0, 1, \ldots N - 1. \quad \text{Equation 9}$$

The variable $\Delta$ may represent the iteration and m may represent the number of packets transmitted.

In an example, M=12, N=4, and m=0, 1, 2. The packets transmitted by a user in each iteration as shown in Table 7 may be obtained by using the above equations. Table 7 shows packets transmitted by each user during a cycle. Each packet may be uniquely transmitted by a user per cycle. Each user may transmit all packets across all cycles.

TABLE 7

Packets Transmitted

| User # | $\Delta = 0$ | $\Delta = 1$ | $\Delta = 2$ | $\Delta = 3$ |
|---|---|---|---|---|
| User-0 | 0, 4, 8 | 1, 5, 9 | 2, 6, 10 | 3, 7, 11 |
| User-1 | 1, 5, 9 | 2, 6, 10 | 3, 7, 11 | 0, 4, 8 |
| User-2 | 2, 6, 10 | 3, 7, 11 | 0, 4, 8 | 1, 5, 9 |
| User-3 | 3, 7, 11 | 0, 4, 8 | 1, 5, 9 | 2, 6, 10 |

In each iteration, a packet may be uniquely transmitted by a user. For example, in iteration $\Delta=0$, User-0 may transmit packets 0, 4, 8 corresponding to m=0, 1, 2 respectively. Across all iterations, each member may transmit all packets. If a packet is received by at least one member after iteration $\Delta=3$, each member may have recovered its lost packets.

If a member has lost a packet that it is supposed to transmit in an iteration, it may eventually be transmitted by another member in a different iteration. For example, if user-0 has lost packet-4, it will not be able to transmit it during $\Delta=0$. However, packet-4 may be transmitted by user-3 during $\Delta=1$. Each member may be assigned fair loading for packet transmission. In the example above, each member may have a requirement to transmit three packets in every iteration. Alternately, members may transmit unequal packets in every iteration. Even if the members transmit unequal packets in every iteration, each member may still transmit an equal number of packets across every iteration. For example, in $\Delta=1$, user-1 and user-2 may transmit two and six packets, respectively but they may transmit six and two packets in $\Delta=2$. Though this scheme may be unfair to users across each iteration, it may be fair across all iterations.

Each member may signal to the group once it has repaired its lost packets so that the iterations may be stopped after receiving this message from all members of the group. The network may configure the starting time, for example a system frame number-subframe number (SFN-SF) combination, to begin the packet repair process. A time that a user should transmit its packets may be preconfigured based on the user-id as shown in Table 7. For example, the network may be configured to start the packet repair process every even or odd frame number. From this absolute time, each user-id may calculate its opportunity for transmission.

A packet repair mode using priority based probabilistic schema may be efficient when there is a constraint in sidelink resources, as the scheme may attempt to repair packet losses in minimum transmission opportunities. A packet repair mode using a random packet loss scheme may become useful when there are enough sidelink resources/bandwidth and/or packet losses are high.

Although the description herein considers 3GPP specific protocols, it should be understood that embodiments are not restricted to this scenario and are applicable to other wireless systems. In addition, although examples described herein include drones and aerial vehicles, it should be understood that embodiments apply to all wireless terminals.

Figure 6:
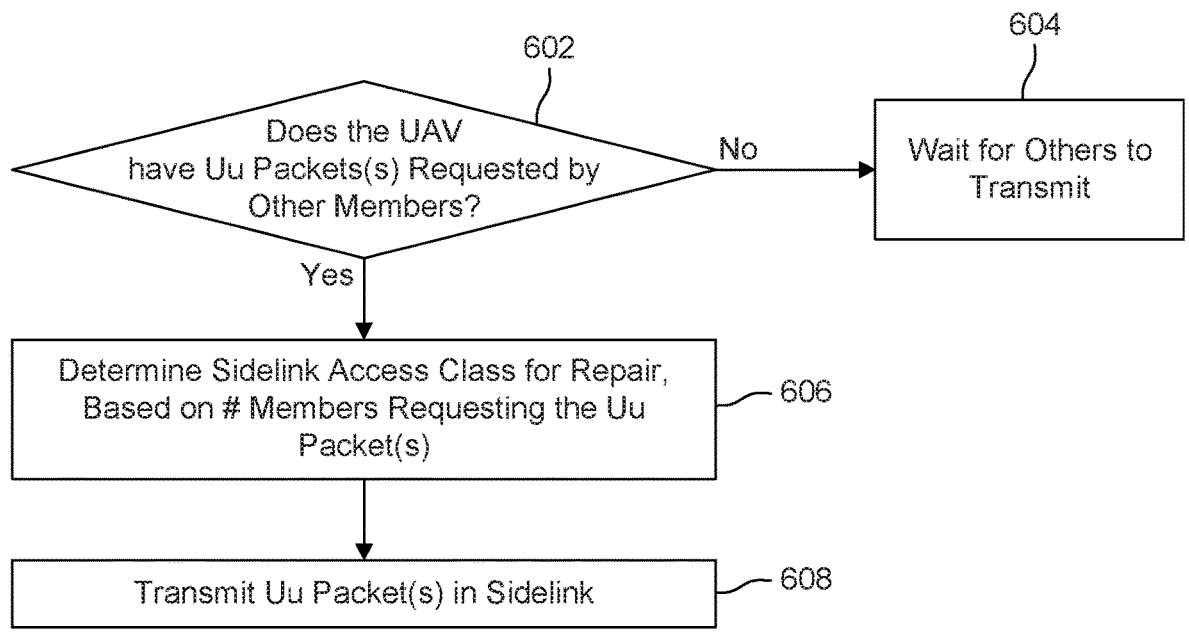
FIG. 6 is a flowchart illustrating groupcast packet repair.

FIG. 6 is a flowchart illustrating group packet repair. In step 602, a UAV may determine if it has packets received over the Uu interface that are being requested by others. If no, in step 604, the UAV may wait for others to transmit. If yes, in step 606, the UAV may determine a sidelink access class for repair based on the number of group members requesting the packets. In step 608, the UAV may transmit the packets to other group members using sidelink communications.

Figure 7:
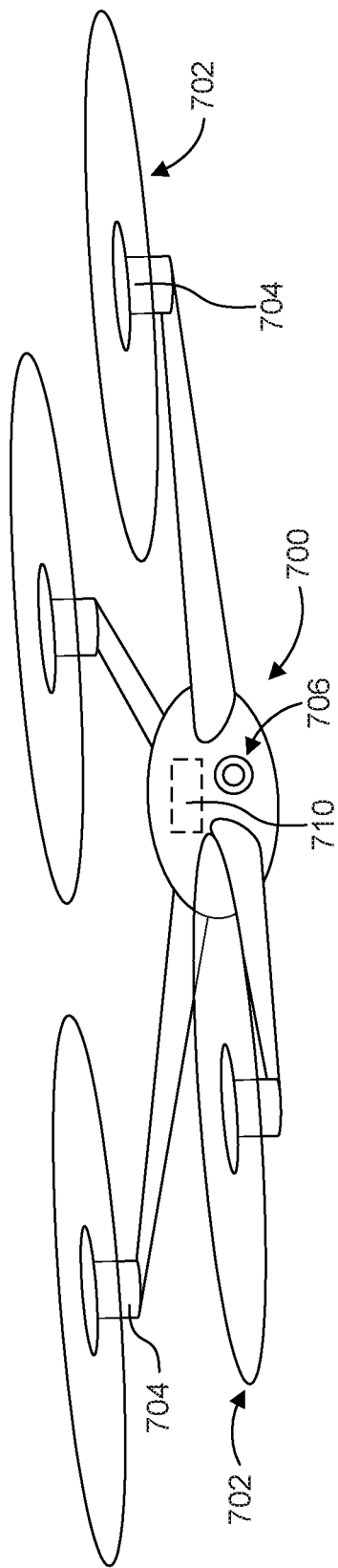
FIG. 7 shows an example UAV.

FIG. 7 shows an example UAV 700 that may be used in a UTM system. The UAV 700 may be any type of conventional aerial vehicle that has the ability to fly without a pilot. The UAV 700 may be a fixed wing drone, a multi-rotor drone, a single-rotor drone, an inflatable drone or a hybrid drone. The UAV 700 is illustrated as a four propeller drone, but any drone configuration that can fly within an anticipated area of deployment can be used. The UAV 700 may have an electronic processing circuit configured to execute machine instructions to carry out the tasks described herein. The UAV 700 may communicate with a UTM and/or other UAVs wirelessly during flight, for example using a short or long range wireless communication protocol, examples including WiFi, WiMAX, BLUETOOTH, SIGFOX, 3G, 4G, LTE, or another protocol, for example using a publicly available frequency.

The UAV 700 may have varying amounts of processing capability, but includes at least sufficient processing capacity to fly, and further includes the components normally associated with a UAV, such as a means of propulsion, for example one or more propellers 702 driven by a motor 704, a power source 134, one or more cameras 706, and a control circuit 710. The control circuit 710 may include flight related sensors, electronics, and software as well as communications electronics, including wireless two way communication for remote or semi-autonomous control, although the UAV 700 may be implemented as fully autonomous.

The control circuit 710 may include electronics necessary to carry out flight in accordance with an intended mission, whether that is remote piloted, semi-autonomous, or fully autonomous. The electronics in the control circuit 710 may be similar to those of the WTRU 102 described above with reference to FIG. 1B. The electronics may include one or more processors 118, one or more transceivers 120, one or more antennae 122, a GPS chipset 136, etc.

A UAV may determine packet losses in the Uu interface in a configured time window. The UAV may determine an access class for accessing the sidelink, and may perform a random back off based on the determined access class. Any member of a group with the GRNTI may generate a gNACK for the common packet loss experienced by the group, or the eNB may configure a member of the group to transmit the gNACK.

UAVs in a group may receive a GRNTI specific configuration, including a subgroup PUCCH gNACK resource. UAVs may transmit NACK in the assigned subgroup PUCCH gNACK resource if decoding fails. An eNB may re-transmit the packet if NACK is decoded in all the subgroup PUCCH gNACK resources.

An eNB may decode a presence/absence of NACK in all subgroup PUCCH gNACK resources consecutively for T sub-frames. A UAV may receive signaling for a mode change between block-based gNACK & instantaneous gNACK from the eNB. The UAV may further receive configuration information for transmitting block-based gNACK feedback (e.g., starting sub-frame number, length, number bits per sub frame).

A UAV may determine packets lost/received by other members of the group in a configured time window. The UAV may determine the access class for accessing the sidelink based on the number of users that may be simultaneously repaired in the current transmission opportunity. The UAV may perform a random back off based on the determined access class.

An eNB may determine Uu group packet loss and or sidelink bandwidth constraints. UAVs in the group may receive configuration for sidelink packet repair mode (e.g., random packet transmission repair mode and/or network coding) based on Uu group packet loss.

The group member may signal the eNB requesting the MAC packets to be of equal size amenable for network coding so as to implement the access class based schema described above. Alternately, based on the energy thresholding scheme described above, the eNB may determine whether the MAC packets need to be of equal size when transmitting its Uu broadcast packets.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a wireless transmit/receive unit (WTRU), the method comprising:
   receiving a downlink communication from a network over a first interface, wherein the downlink communication is transmitted to one or more WTRUs in a group of WTRUs;
   determining an access class of the WTRU based on a packet loss percentage of the downlink communication, wherein the access class is associated with a contention window for accessing a second interface;
   transmitting packet loss information to the one or more WTRUs over the second interface in the contention window;
   receiving packet loss feedback from the one or more WTRUs over the second interface;
   determining that the access class of the WTRU is a highest access class of the one or more WTRUs; and
   transmitting a single groupcast negative acknowledgement (gNACK) to the network on behalf of the one or more WTRUs over the first interface, wherein the gNACK is based on the packet loss feedback.

2. The method of claim 1, wherein the packet loss information is transmitted using a random back off procedure in the contention window.

3. The method of claim 1, wherein the access class corresponds to a predetermined range of packet loss percentage values.

4. The method of claim 3, wherein the one or more WTRUs are configured with the predetermined range of packet loss percentage values.

5. The method of claim 1, wherein a low packet loss percentage corresponds to an access class having an early contention window and preferential channel access.

6. The method of claim 1, wherein a high packet loss percentage corresponds to an access class having an early contention window and preferential channel access.

7. The method of claim 1, wherein the packet loss feedback is received in one or more contention windows based on an access class of the one or more WTRUs of the group of WTRUs.

8. The method of claim 7, wherein the packet loss feedback comprises an indication of lost packets not previously indicated by the one or more WTRUs.

9. The method of claim 1, wherein the single gNACK is sent after a delay based on one or more of a number of WTRUs in the group of WTRUs and a preconfigured time from the eNB.

10. A wireless transmit/receive unit (WTRU comprising:
an antenna; and
a processor operatively coupled to the antenna;
the antenna and the processor configured to receive a downlink communication from a network over a first interface, wherein the downlink communication is trasmitted to one or more WTRUs in a group of WTRUs;
the processor configured to determine an access class of the WTRU based on a packet loss percentage of the downlink communication, wherein the access class is associated with a contention window for accessing a second interface;
the antenna and the processor further configured to transmit packet loss information to the one or more WTRUs over the second interface in the contention window;
the antenna and the processor further configured to receive packet loss feedback from the one or more WTRUs over the second interface;
the process further configured to determine that the access class of the WTRU is a highest access class of the one or more of WTRUs; and
the antenna and the processor further configured to transmit a single groupcast negative acknowledgement (gNACK) to the network on behalf of the one or more WTRUs over the first interface, wherein the gNACK is based on the packet loss feedback.

11. The WTRU of claim 10, wherein the packet loss information is transmitted using a random back off procedure in the contention window.

12. The WTRU of claim 10, wherein the access class corresponds to a predetermined range of packet loss percentage values.

13. The WTRU of claim 12, wherein the one or more WTRUs are configured with the predetermined range of packet loss percentage values.

14. The WTRU of claim 10, wherein a low packet loss percentage corresponds to an access class having an early contention window and preferential channel access.

15. The WTRU of claim 10, wherein a high packet loss percentage corresponds to an access class having an early contention window and preferential channel access.

16. The WTRU of claim 10, wherein the packet loss feedback is received in one or more contention windows based on an access class of the one or more WTRUs of the group of WTRUs.

17. The WTRU of claim 16, wherein the packet loss feedback comprises an indication of lost packets not previously indicated by the one or more WTRUs.

18. The WTRU of claim 10, wherein the first interface is a Uu interface.

19. The WTRU of claim 10, wherein the second interface is a sidelink interface.

20. The WTRU of claim 10, wherein the single gNACK is sent after a delay based on one or more of a number of WTRUs in the group of WTRUs and a preconfigured time from the eNB.

* * * * *